United States Patent [19]

Hiltunen et al.

[11] Patent Number: 5,505,907
[45] Date of Patent: Apr. 9, 1996

[54] APPARATUS FOR TREATING OR UTILIZING A HOT GAS FLOW

[75] Inventors: Matti Hiltunen; Timo Hyppänen, both of Karhula; Kurt Westerlund, Helsinki, all of Finland

[73] Assignee: A. Ahstrom Corporation, Noormarkku, Finland

[21] Appl. No.: 265,041

[22] Filed: Jun. 22, 1994

[30]     Foreign Application Priority Data

Jun. 23, 1993 [FI]  Finland .................... 932923

[51] Int. Cl.$^6$ .................... F27B 15/16; F28D 13/00
[52] U.S. Cl. .................... 422/146; 422/145; 422/147; 122/4 D; 165/104.16; 165/104.18
[58] Field of Search .................... 422/139, 145, 422/146, 147, 143; 122/4 D; 165/104.16, 104.18, 106; 34/578, 589, 591, 363, 370

[56]               References Cited

U.S. PATENT DOCUMENTS

| | | | |
|---|---|---|---|
| 4,119,395 | 10/1978 | Hatanaka et al. ................... | 431/11 |
| 4,356,151 | 10/1982 | Woebcke et al. ................... | 165/104.18 |
| 4,753,177 | 6/1988 | Engstrom et al. ................... | 165/104.16 |
| 4,770,237 | 9/1988 | Morin et al. ................... | 165/104.16 |
| 4,896,717 | 1/1990 | Campbell, Jr. et al. ................ | 165/104.18 |
| 5,167,932 | 12/1992 | Ruottu ................... | 422/145 |
| 5,171,542 | 12/1992 | Sarkomaa ................... | 34/591 |
| 5,205,350 | 4/1993 | Hirsch et al. ................... | 105/104.18 |
| 5,226,475 | 7/1993 | Ruottu ................... | 105/104.18 |
| 5,281,398 | 1/1994 | Hyppanen et al. ................... | 422/147 |
| 5,332,553 | 7/1994 | Hyppanen ................... | 422/147 |

FOREIGN PATENT DOCUMENTS

| | | |
|---|---|---|
| 2086674 | 1/1992 | Canada . |
| 64997 | 8/1986 | Finland ................... F28G 13/00 |
| 2140144 | 11/1984 | United Kingdom ............ F27D 23/02 |
| WO94/11691 | 5/1994 | WIPO . |

Primary Examiner—Robert J. Warden
Assistant Examiner—Hien Tran
Attorney, Agent, or Firm—Nixon & Vanderhye

[57]             ABSTRACT

A method and apparatus for cooling hot gas in a reactor in which the lower section of the reactor is provided with an inlet for hot gas and a chamber encompassing a bubbling fluidized bed. A central section of the reactor is provided with a riser, and the upper section with a gas outlet, and the reactor has heat transfer surfaces for recovering heat from solid particles. The riser is defined by vertical walls which are disposed above the bubbling fluidized bed so that they divide the fluidized bed into concentric outer and inner parts. From the inner part of the fluidized bed solid particles are supplied to the hot inlet gas for cooling thereof. The gas containing solid particles is conveyed through the riser into the upper section of the reactor, where solid particles are separated from the gas in a particle separator and returned to the fluidized bed into the outer part thereof.

25 Claims, 4 Drawing Sheets

APPARATUS FOR TREATING OR UTILIZING A HOT GAS FLOW

BACKGROUND AND SUMMARY OF THE INVENTION

The present invention relates to a method and apparatus for cooling or utilizing hot gas in a reactor in which the lower section of the reactor is provided with a hot gas inlet and a chamber encompassing a fluidized bed, the middle section is provided with a riser, and the upper section with a gas outlet, and the reactor has heat transfer surfaces for recovering heat from solid particles. The invention especially relates to a method, in which hot gas is introduced through the inlet into the lower section of the reactor, and solid particles from the bubbling fluidized bed are fed to the inlet gas for cooling thereof, solid particles are separated from the cooled gas and returned to the fluidized bed, heat is recovered from the separated solid particles, and the cooled gas is discharged through the gas outlet.

Fluid bed reactors are well suited to cooling of hot gases containing molten and/or vaporized components and/or tar-like particles. Gas coolers are suited to. e.g., cooling of exhaust gases from industrial plants and dry purification of gases from partial oxidation of biomass, peat or coal containing dust and tar and other condensing components. The hot gases introduced into the reactor are efficiently cooled by mixing solid particles therewith, such solid particles having been cooled earlier in the reactor.

Finnish patent 64997 teaches cooling of hot gases in circulating fluidized bed reactors. Here hot gases are fed as fluidizing gas into the mixing chamber of the reactor, where the gases cool efficiently as they come into contact with a large volume of solid particles, i.e., bed material. Solid particles are carried by the gas flow through the riser into the upper section of the reactor, where they are separated and then returned to the fluidized bed in the mixing chamber. In the riser, the gas flow conveying solid particles may be cooled by heat transfer surfaces.

A drawback of the method described above is, however, that the hot gases to be cooled have to fluidize a large volume of solid particles, resulting in a high power requirement. On the other hand, a sudden interruption in the power supply may result in the entire bed flowing through the inlet and then out of the reactor.

U.S. Pat. No. 5,205,350 also teaches cooling of hot process gas during stationary fluidization, i.e., a bubbling fluidized bed. Here the hot gas flowing into the reactor is supplied with solid particles as an overflow from the bubbling fluidized bed. The gas and the solid particles entrained therewith flow into a dust collector disposed above the bubbling fluidized bed, from which solid particles then drop back onto the surface of the bubbling fluidized bed as the flow rate of the gas quickly decreases. The bubbling fluidized bed and the gas riser, which is disposed above the dust collector, are provided with heat transfer surfaces.

In the arrangement described above, the particles falling onto the surface of the bubbling fluidized bed are carried along the surface back to the overflow point, where they are immediately taken to recirculation, ending up in the dust collector. Thus, a separate "surface circulation" of hot particles develops above the fluidized bed. These particles do not cool efficiently in the fluidized bed because the particles which are deeper down in the fluidized bed, near the heat transfer surfaces, cannot mix efficiently with the particles present in the "surface circulation".

In the method described above, the riser is considered a natural place for the heat transfer surfaces because the solids and gas flows are swift in the riser. The gas stream, however, causes wear of the heat transfer surfaces in the riser. Wear is partly attributable to the composition of the gas as well as to the dust contained in it, and partly to the high flow rate of the gas.

In some cases, the hot gas flowing to the separator may cause fouling and clogging of the heat transfer surfaces when the gas enters the heat transfer surfaces at too high a temperature. If the hot gas does not cool until it touches the heat transfer surfaces, the impurities will correspondingly condense on or adhere to these surfaces, and not on the circulating mass particles as intended.

Chlorine-containing gases, in particular, cause corrosion at high temperatures and, therefore, superheating of steam to high temperatures is not usually possible in the heat transfer surfaces of the riser. $SO_3$ may cause problems with the heat transfer surfaces at low temperatures.

According to the present invention an improved method and apparatus, when compared with the above-described methods and apparatus, for cooling or utilizing hot gases in the hot gas treatment of solid material are provided. The method and apparatus of the invention are provided to minimize power consumption and wear of the heat transfer surfaces.

The method and apparatus provide means by which the heat energy released by the hot gas when it cools may be utilized as efficiently as possible, e.g., for generation of superheated steam.

To achieve the above objects, the method of the invention provides for cooling hot gas in a reactor with a bubbling fluidized bed. The cooled gas containing solid particles is conveyed through the riser, which is defined by substantially vertical walls, and introduced into the upper section of the reactor, where solid particles are separated from the gas in a particle separator. The separated solid particles are returned to the bubbling fluidized bed into the outer part thereof, heat is recovered from separated solid particles in a return duct, fluidized bed and/or riser, the solid particles from the inner part of the bubbling fluidized bed are fed into the hot inlet gas.

Exemplary apparatus according to the present invention comprises the following elements: A reactor chamber comprising an upper section and a lower section. A gas inlet tube centrally located in the lower section. A riser extending from the gas inlet tube to the upper section. At least one particle separator located in the upper section for separating particles from gas flowing upwardly in the riser. A bubbling fluidized bed in the lower section, separated into distinct inner and outer substantially concentric parts. A return duct from each of the separators into the outer part of the fluidized bed. A gas outlet from the upper section. Means for cooling particles between the riser and the inner part of the fluidized bed. And, means for introducing particles from the inner part of the fluidized bed into gas introduced into the gas inlet tube to effect cooling of the gas.

According to a preferred embodiment of the invention, the means for feeding cool particles into the hot gas in the inlet may comprise an overflow from the bubbling fluidized bed, directed toward the hot gas flowing through the inlet. Alternatively, the wall between the hot gas inlet and the chamber encompassing the fluidized bed may be provided with openings through which solid particles are introduced into the hot gas flow. Due to a higher static pressure of the fluidized bed, solid material automatically flows through the openings to the hot gas flow, or it may also be conveyed by a transporting gas through the openings into the gas flow. Other mechanisms, such as mechanical devices, may also be provided for this purpose.

In the reactor according to the invention, hot gas is cooled to a substantially lower temperature immediately at the gas inlet by mixing cooled solid particles with the gas, so that the gas cools and the solid particles are correspondingly heated. Besides cooling of gases, the invention may be employed in processes where solid material is heated with hot gases, such as, e.g., heating lime with hot gases. The hot gases are at a temperature over 400° C., typically over 1000°–1300° C. The gas is cooled at least about 100° C., e.g. cooled from over 400° C. to about 200°–400° C.

In a reactor according to the invention, gas may also be cooled in the riser, so that the riser is defined by cooled surfaces, such as for example superheating panels. In the upper section of the reactor, solid particles are separated in a particle separator from the gas which is then exhausted from the reactor. The solid particles are conveyed as a dense suspension, almost as a plug flow, via the return duct back to the bubbling fluidized bed. In the return duct is preferably disposed heat recovery surfaces for recovering the heat energy released by heated solid particles. The heat recovery surfaces are preferably disposed in a dense suspension area.

The return duct is a favorable location for heat transfer surfaces because the particle density is relatively high there, which results in beneficial heat transfer, and because the return duct contains fewer corrosive gaseous components than, e.g., the riser. Hot gas containing molten or condensing components, which might clog the heat transfer surfaces, are also not present in the return duct.

Heat transfer surfaces may also be disposed in the fluidized bed itself, where the flow is slow and thereby favorable for the durability of the heat transfer surfaces.

A portion of the solid particles which are first carried upwardly entrained with the gas, flows down along the riser walls, back to the lower section of the reactor. This portion is partly cooled provided that the wall is a cooling surface. Cooling of the solid particles may be further improved by providing the lower section of the wall with a pocket which collects the solid particles flowing down along the wall and then leads them to the lower section of the return duct, preferably to heat transfer surfaces. Thus, also a portion of those solid particles which the gas is not capable of carrying as tar as to the particle separators, is subjected to efficient heat transfer.

The method and apparatus according to the invention provide a simple arrangement for minimizing wear of heat transfer surfaces in the gas cooler. At the same time, power consumption is lowered compared to the prior art. Furthermore, in the arrangement according to the invention, the heat energy released by the gases is effectively utilized, e.g., by generated superheated steam.

DETAILED DESCRIPTION OF THE DRAWINGS

Figure 1:
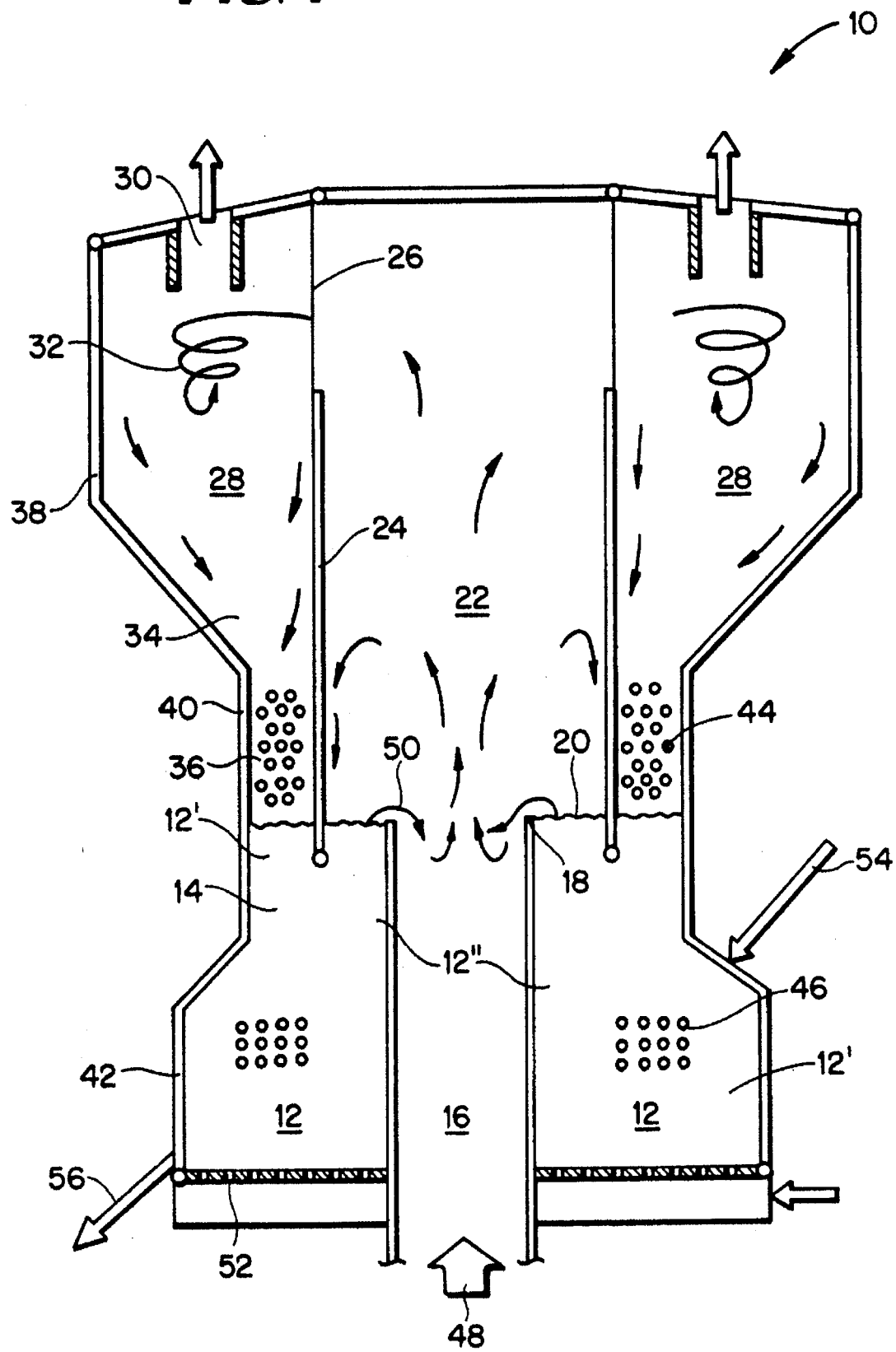
FIG. 1 is a schematic illustration of a first embodiment of reactor system according to the invention.

FIG. 1 illustrates a reactor 10 for cooling or utilizing hot process gases. The reactor 10 comprises an annular chamber 12 which has an open top and which is disposed in the lower section of the reactor. The chamber has distinct outer 12' and inner 12" parts, and is provided with a bubbling fluidized bed 14. In the center of the annular chamber 12 is disposed an inlet duct or conduit 16 for hot gases, the top edge 18 of which is even with the bubbling fluidized bed 14 top surface 20.

On top of the chamber 12 is provided a cylindrical riser 22 of the reactor, the diameter of the riser 22 being larger than that of the inlet duct 16 but smaller than that of the annular chamber 12. The cylindrical riser 22 is defined by cooling panels or walls 24. The upper part of the riser 22 is provided with openings 26, which bring the riser 22 into contact with particle separators 28, which are structurally integrated with the riser 22. The inlet duct or conduit 16, chamber 12, and riser 22 may be square, rectangular, or some other cross-sectional shape. In the embodiment of FIG. 1, the walls of the riser 22 extend down to the fluidized bed 14. In some embodiments, the walls 24 may end a little bit above the fluidized bed.

The particle separators 28 form an annular volume around the cylindrical riser 22. The riser walls/cooling panels 24 constitute the inner walls of the particle separator 28. The particle separators 28 are preferably cyclone separators, where gas outlets 30 and inlet openings 26 provide a vortex flow for each outlet 30. The lower section 34 of each particle separator is in communication with a return duct 36, which connects each particle separator 28 with the fluidized bed 14. The return duct forms an annular slot around the riser 22. The wall 24 of the riser 22 constitutes the inner wall of the return duct 36. The outer wall 38 of the particle separator 28, outer wall 40 of the return duct 36 and outer wall 42 of the annular chamber 12 may all be of one and the same construction, e.g., membrane panel, which has been bent to a desired shape.

The return duct 36 is provided with heat transfer surfaces or heat exchanger 44. The fluidized bed 14 is also provided with heat transfer surfaces or heat exchanger 46.

The reactor 10 functions so that hot gas (e.g. above 400° C., typically about 1000°–1300° C.) 48 is introduced into the reactor through an inlet duct 16, which hot gas is mixed with cooled solid particles by flowing the particles as an overflow 50 over the inlet duct edges 18. The hot gas cools very quickly by releasing heat energy to solid particles.

The gas and solid particles entrained therewith flow as a suspension upwardly in the riser 22. A portion of the particles is separated from the gas and flows along walls 24 back to the fluidized bed, simultaneously releasing heat energy to the walls 24. The gas suspension flows via inlet opening 26 to the particle separator 28, where solid particles are separated from the gas. Purified and cooled gases are led out of the reactor 10 through the outlet 30.

The separated solid particles are allowed to flow by gravity downwardly in the return duct 36. Solid particles cool while releasing part of their heat energy in the heat exchanger 44. Solid particles further cool in the fluidized bed by the effect of the heat exchanger 46. The heat exchangers 44, 46 may be connected up to heat recovery apparatus, such as other heat exchangers, a generator, or the like.

Appropriate fluidizing, in respect of both overflow and heat transfer, is maintained in the fluidized bed by leading fluidizing air or fluidizing gas (e.g. inert gas) through nozzles :52 into the annular chamber 12. The overflow lip or top edge 18 is at least about one meter above the nozzles 52, and the wall/panels 24 bottom lip extends into the bed 14, below lip 18, dividing the bed at the top thereof into inner and out parts 12', 12". The volume of solid particles in the reactor 10 may be regulated by adding particles via conduit 54 or by discharging them via conduit 56.

Figure 2:
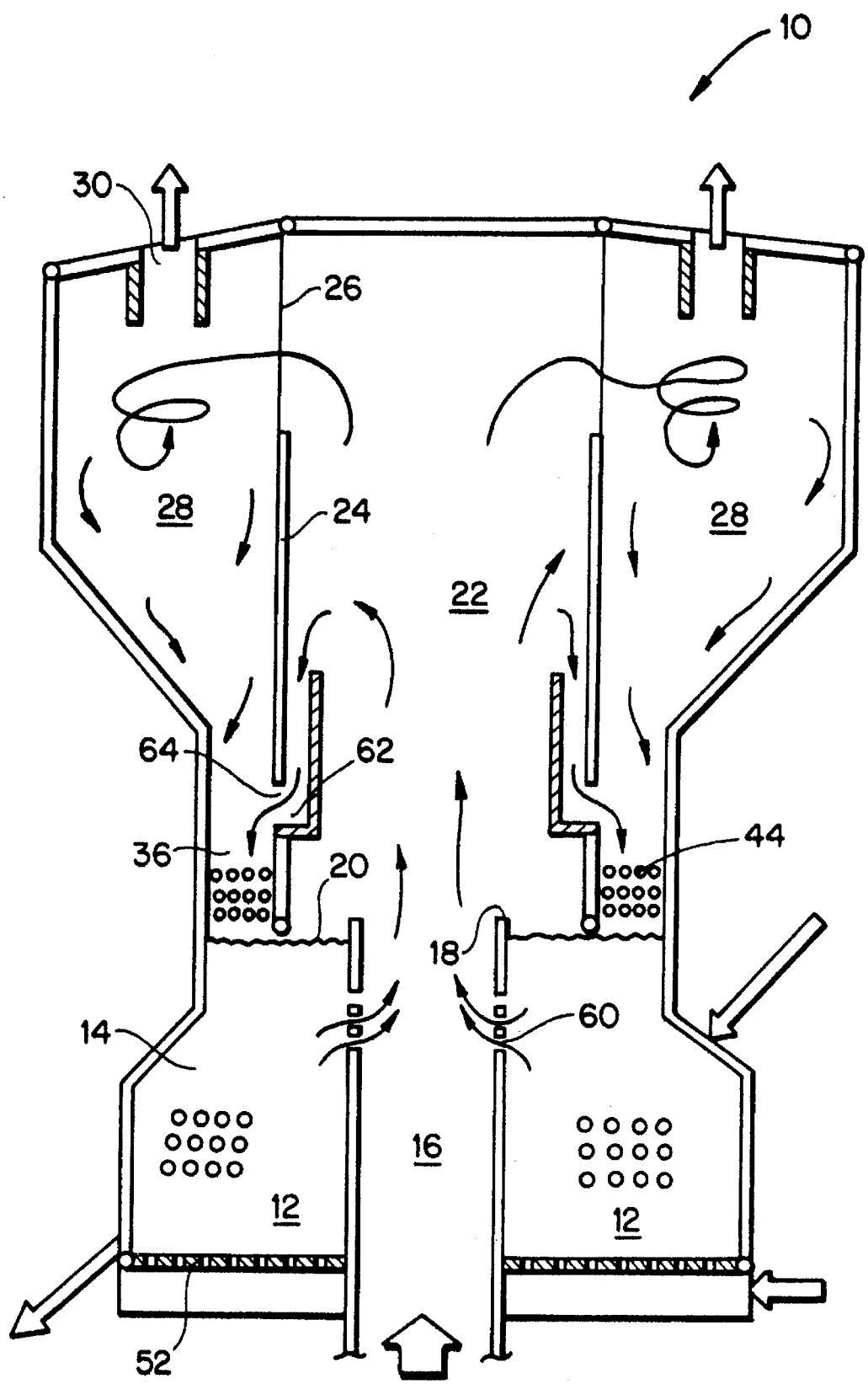
FIG. 2 is a schematic illustration of a second embodiment.

FIG. 2 illustrates a second way of practicing the invention. Corresponding items of FIGS. 2 and 1 are denoted with the same reference numerals. FIG. 2 especially shows another arrangement for leading solid particles from the fluidized bed 14 into the hot gas inlet duct 16 and a new arrangement for leading tile particles flowing along the riser walls 24 into the fluidized bed 14.

The hot gas inlet duct 16 is provided with openings 60 through which solid particles from the fluidized bed 14 flow into the inlet duct 16. The pressure difference between the fluidized bed 14 and the inlet duct 16 functions as a carrying force. The particles flowing into the inlet duct 16 are immediately mixed with the hot gas and are carried therewith up into the riser 22.

The wall 24 of the riser 22 is provided with an internal pocket 62 which is connected with the return duct 36 via an opening 64. In the riser 22, a portion of the particles flowing upwardly with the gases lose their speed and start to flow downwardly along walls 24. These particles end up in the pockets 62, from which they may be led via openings 64 into the return duct 16. In the return duct 16, the particles cool efficiently while passing by the heat transfer surfaces 44. With this construction it is possible to intensify the cooling of particles if the capability of the heat transfer surfaces of the walls 24 is insufficient for cooling the particles.

In the embodiment shown in FIG. 2, the cross section of the inlet duct 16 for hot gases has the shape of an elongated slot. Correspondingly, the cross section of the riser 22 has the shape of an elongated rectangle, and the fluidized bed 14 is arranged in two rectangular chambers which are of the same length as the substantially slot-shaped inlet duct 16 and which are disposed on both sides thereof. The particle separators 28 are also rectangular in cross section, and they are parallel with the riser 22 and disposed on both sides thereof.

Figure 3:
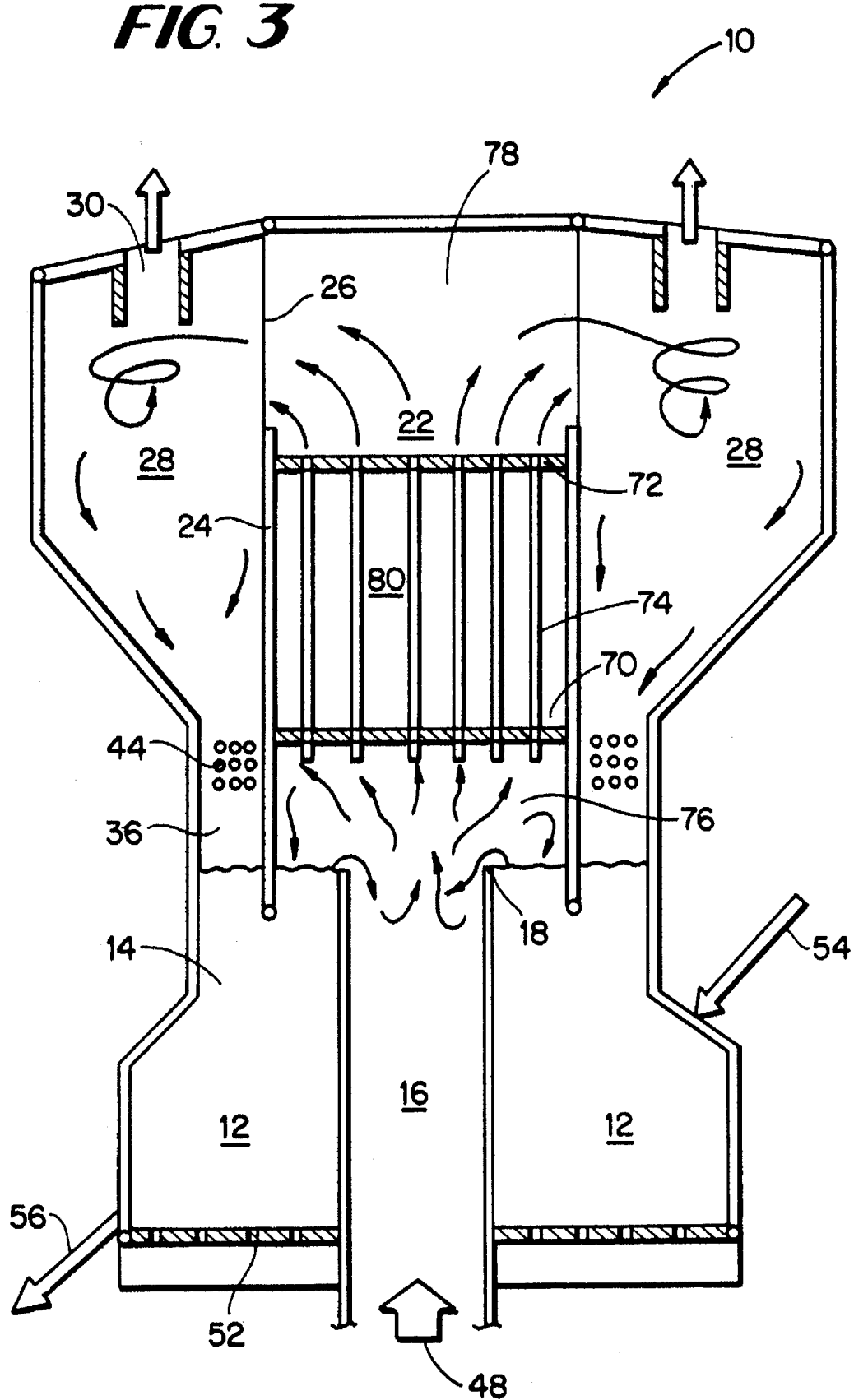
FIG. 3 is a schematic illustration of a third embodiment.

FIG. 3 illustrates a third exemplary way of applying the arrangement of the invention for treating hot gases. Items corresponding to those of FIG. 1 are denoted with the same reference numerals. Differently from the arrangement shown in FIG. 1, the riser 22 in FIG. 3 is of a fire tube construction. The riser 22 is provided with two horizonal tube plates 70 and 72, which are similar to the cross section of the riser in shape. Between the tube plates 70, 72 are ducts 74 to connect the riser space 76 below the tube plates 70. 72 with the riser space 78 above the tube plates 70, 72. The free space 80 between the ducts 74 is filled with heat transfer medium, such as water or air.

In the embodiment of FIG. 3, the gas suspension produced in the lower section of the riser 22 is conveyed through ducts 74 to the upper section 78 of the riser 22. The gas suspension flowing in the ducts 74 is cooled indirectly with heat transfer medium. By employing the fire tube arrangement, cooling of solid material may be intensified in the riser 22, especially in low pressure embodiments.

Figure 4:
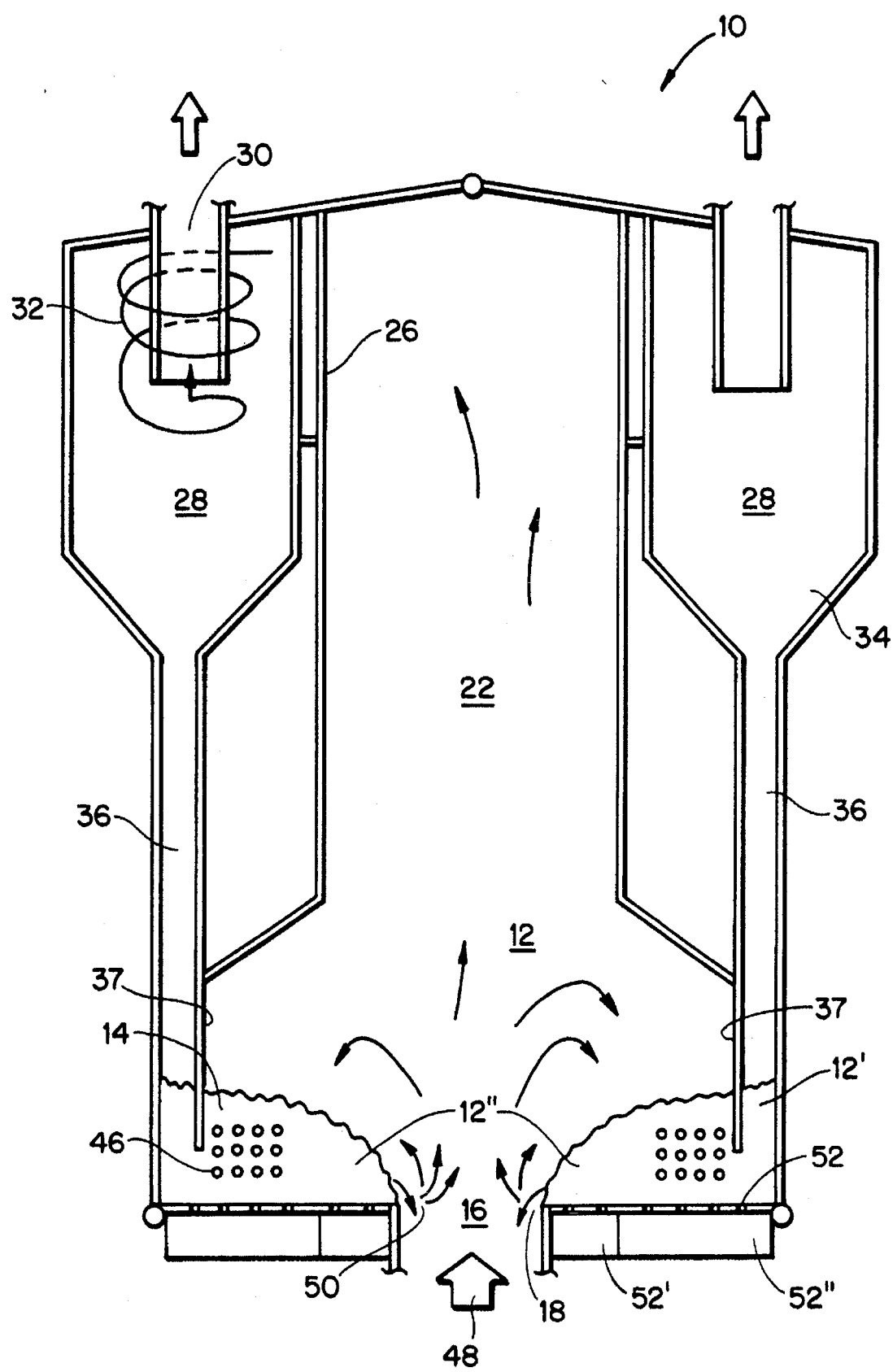
FIG. 4 is a schematic illustration of a fourth embodiment.

FIG. 4 illustrates a reactor 10 for cooling or for utilizing hot process gases. The reactor 10 comprises a chamber 12 which has an open top and which is disposed in the lower section of the reactor. The chamber has an outer part 12' and an inner part 12" and is provided with a bubbling fluidized bed 14. In the center of the chamber is disposed a duct or conduit 16 for hot gases, the top edge 18 or which is even with the level of the nozzles 52 for introducing fluidizing gas to the bubbling fluidized bed 14.

On top of the chamber 12 is provided a riser 22 of the reactor 10. The upper part of the riser 22 is provided with openings 26, which bring the riser into contact with particle separators 28, which are structurally integrated with the riser 22. The inlet duct or conduit 16, chamber 12, and riser 22 may have a square, rectangular or other cross-section.

The particle separators 28 are cyclone separators, having gas outlets 30 and inlet 26 provide a vortex flow 32 per each outlet. The lower section 34 of the particle separator 28 is in communication with a return duct 36, which connects the particle separator 28 with the fluidized bed 14. The fluidized bed 14 is provided with heat transfer surfaces 46. In this embodiment the return ducts 36 have a common wall 37 concentric with the gas inlet tube 16, the wall 37 also defining bed 14 into inner and outer concentric parts 12", 12', respectively.

The reactor 10 functions so that hot gas 48 is introduced into the reactor 10 thorugh an inlet duct 16, which hot gas is mixed with cooled solid particles by flowing these as an overflow 50 over the inlet duct edges 18. The hot gas cools very quickly by releasing heat energy to solid particles. In this embodiment, the upper surface of the bed 14 extends higher than the edge 18 of the duct 16. By appropriate adjusting of the fluidization, e.g., by arranging separated, separately controllable zones 52', 52", it is possible to arrange the bed upper surface to be at a higher level than the top edge of the duct 16. This also means that the top level of the bed 14 is maintained above the level of the edge 18. In this embodiment, the length of the inlet duct 16 is minimized. So, in this embodiment the gas flow is introduced through the inlet duct 16 into the lower section of the reactor at a level substantially equal to the level of nozzles 52 for introducing fluidization gas into the fluidized bed 14. This feature is of benefit specially in cases when the gas flow 48 contains large amounts of fouling components. Mixing of cooled particles and gases takes place mainly at section above the edge 18 so that the suspension is in contact with solid particles of bed 14, and essentially not with a solid wall, which diminishes the clogging tendency of the inlet duct 16. The top portion to the duct 16 may even be constructed to be in form of a downwardly opening cone resulting in a very thin top of edge 18, which even more diminishes the contact area with the solid wall structure.

The gas and solid particles entrained therewith flow as a suspension upwardly in the riser 22. The gas suspension flows via inlet opening 26 to the particle separator 28, where solid particles are separated from the gas. Purified and cooled gases are led out of the reactor through the outlet 30.

The separated solid particles are allowed to flow by gravity downwardly in the return duct 36. Solid particles cool in the fluidized bed by the effect of the heat exchanger 46.

Appropriate fluidizing of both the flow of particles into the duct 16, and cooling fluid in the heat transfer surfaces, is maintained in the fluidized bed by leading fluidizing air or fluidizing gas through nozzles 52 into the chamber.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for cooling hot gases in a reactor, comprising:

a reactor chamber comprising an upper section and a lower section;

a gas inlet tube for introducing hot gas into said reactor chamber, and substantially centrally located in said lower section;

a riser extending from said gas inlet tube to said upper section;

at least one particle separator located in said upper section for separating particles from hot gas flowing upwardly in said riser;

a divided bubbling fluidized bed in said lower section having distinct inner and outer substantially concentric parts, where said inner substantially concentric part is demarcated from said outer substantially concentric part by a divider wall in said reactor chamber;

a return duct from each of said at least one separator for returning particles separated by said at least one separator into said outer part of said fluidized bed;

a gas outlet disposed in said upper section;

means for cooling particles travelling between said riser and said inner part of said fluidized bed; and means for introducing particles from said inner part of said fluidized bed into the hot gas introduced into said gas inlet tube to effect cooling of the hot gas.

2. Apparatus as recited in claim 1 wherein said gas inlet tube is a vertical tube having a vertical edge, said vertical edge defining an innermost portion of said inner part of said fluidized bed; and wherein said means for introducing particles comprises means for providing an overflow of particles from said fluidized bed over said vertical edge into the hot gas flowing through said inlet tube.

3. Apparatus as recited in claim 1 wherein said gas inlet tube has a plurality of openings formed therein; and wherein said means for introducing particles from said inner part of said fluidized bed into the hot gas comprises means for transporting particles from said bed inner part into said gas inlet tube through said openings therein.

4. Apparatus as recited in claim 1 wherein said riser and said return duct are defined by a common wall.

5. Apparatus as recited in claim 1 further comprising fluidizing nozzles for fluidizing the particles in said fluidized bed; and wherein said inlet gas tube has an open top thereof at substantially the same vertical level as said fluidizing nozzles.

6. Apparatus as recited in claim 1 further comprising fluidizing nozzles for fluidizing the particles in said fluidized bed; and wherein said inlet gas tube has an open top thereof significantly vertically above said fluidizing nozzles.

7. Apparatus as recited in claim 1 wherein said cooling means further comprises heat transfer surfaces disposed in said return duct.

8. Apparatus as recited in claim 7 wherein said cooling means further comprises heat transfer surfaces disposed in said outer part of said fluidized bed.

9. Apparatus as recited in claim 7 wherein said cooling means further comprises heat transfer surfaces disposed in said riser significantly vertically above said gas inlet tube.

10. Apparatus as recited in claim 1 wherein said cooling means comprises heat transfer surfaces disposed in said outer part of said fluidized bed.

11. Apparatus as recited in claim 10 wherein said cooling means further comprises heat transfer surfaces disposed in said riser significantly vertically above said gas inlet tube.

12. Apparatus as recited in claim 1 further comprising a pocket formed in said riser below said at least one separator, said pocket in communication with said return duct.

13. Apparatus as recited in claim 12 wherein said cooling means comprises cooling surfaces disposed in said return duct below said pocket.

14. Apparatus as recited in claim 1 wherein said riser and said at least one separator have a common wall structure.

15. Apparatus for cooling hot gases in a rector, comprising:

a rector chamber comprising an upper section and a lower section;

a gas inlet tube for introducing hot gas into said reactor chamber, and substantially centrally located in said lower section;

a riser extending from said gas inlet tube to said upper section;

at least one particle separator located in said upper section for separating particles from hot gas flowing upwardly in said riser;

a bubbling fluidized bed in said lower section having distinct inner and outer substantially concentric parts;

a return duct from each of said at least one separator for returning particles separated by said at least one separator into said outer part of said fluidized bed;

a gas disposed in said upper section;

means for cooling particles travelling between said riser and said inner part of said fluidized bed; and means for introducing particles from said inner part of said fluidized bed into the hot gas introduced into said gas inlet tube to effect cooling of the hot gas;

wherein said at least one separator comprising a plurality of separators, and a plurality of return ducts are provided having a common wall concentric with said gas inlet tube, said common wall extending vertically downwardly from said separators into said fluidized bed and separating said bed into said inner and outer substantially concentric parts.

16. Apparatus for cooling hot gases in a reactor, comprising:

a reactor chamber comprising an upper section and a lower section;

a gas inlet tube for introducing hot gas into said reactor chamber, and substantially centrally located in said lower section;

a riser extending from said gas inlet tube to said upper section;

at least one particle separator located in said upper section for separating particles from the hot gas flowing upwardly in said riser;

a bubbling fluidized bed in said lower section, wherein said bubbling fluidized bed is separated into distinct inner and outer substantially concentric parts by a portion of said riser extending below the level of fluidized particles in said bubbling fluidized bed;

a return duct from each of said at least one separator for returning particles separated by said at least one separator into said outer part of said fluidized bed;

a gas outlet disposed in said upper section;

means for cooling particles travelling between said riser and said inner part of said fluidized bed; and means for introducing particles from said inner part of said fluidized bed into the hot gas introduced into said gas inlet tube to effect cooling of the hot gas.

17. Apparatus as recited in claim 16 wherein said portion of said riser extending into the particles of said bubbling fluidized bed comprises tube panels, forming part of said means for cooling particles.

18. Apparatus for cooling hot gases in a reactor, comprising:
- a reactor chamber comprising an upper section and a lower section, and having first heat transfer surfaces associated therewith for recovering heat from solid particles;
- a gas inlet tube for introducing hot gas into said reactor chamber, located in said lower section;
- a riser extending from said gas inlet tube to said upper section;
- at least one particle separator operatively connected to said reactor chamber for separating particles from hot gas flowing upwardly in said riser;
- a bubbling fluidized bed in said lower section;
- a divider for dividing said bubbling fluidized bed into separate and distinct inner and outer parts;
- at least one return duct from said at least one separator, for returning particles separated by said at least one separator into said outer part of said bubbling fluidized bed;
- a gas outlet disposed in said upper section;
- second heat transfer surfaces for cooling particles disposed in said at least one return duct for cooling particles prior to return of the particles to said outer part of said bubbling fluidized bed; and
- means for introducing particles from said inner part of said bubbling fluidized bed into the hot gas introduced into said gas inlet tube to effect cooling of the hot gas introduced into said reactor by said inlet tube.

19. Apparatus as recited in claim 18 wherein said divider comprises a lower portion of a wall to said riser, said lower portion of said wall extending into said bubbling fluidized bed.

20. Apparatus as recited in claim 19 wherein said lower portion of said riser extending into said bubbling fluidized bed includes part of said first heat transfer surfaces.

21. Apparatus as recited in claim 20 wherein said gas inlet tube is a vertical tube having a vertical edge, said vertical edge defining an innermost portion of said inner part of said fluidized bed; and wherein said means for introducing particles comprises means for providing an overflow of particles from said fluidized bed over said vertical edge into gas flowing through said inlet tube.

22. Apparatus as recited in claim 18 wherein said gas inlet tube has a plurality of openings formed therein; and wherein said means for introducing particles from said inner part of said fluidized bed into gas comprises means for transporting particles from said bed inner part into said gas inlet tube through said openings therein.

23. Apparatus as recited in claim 18 wherein said first heat transfer surfaces are disposed in said riser above a gas inlet disposed in a flow path of the hot gas from said gas inlet tube to said at least one particle separator.

24. Apparatus for cooling hot gases in a reactor, comprising:
- a reactor chamber comprising an upper section and a lower section, and having first heat transfer surfaces associated therewith for recovering heat from solid particles;
- a gas inlet tube for introducing hot gas into said reactor chamber, located in said lower section;
- a riser extending from said gas inlet tube to said upper section;
- at least one particle separator operatively connected to said reactor chamber for separating particles from hot gas flowing upwardly in said riser;
- a bubbling fluidized bed in said lower section;
- at least one return duct from said at least one separator, for returning particles separated by said at least one separator into said outer part of said bubbling fluidized bed, said at least one return duct comprising a lower portion for dividing said bubbling fluidized bed into separate and distinct inner and outer parts;
- a gas outlet disposed in said upper section;
- second heat transfer surfaces for cooling particles, disposed in said bubbling fluidized bed inner part immediately adjacent said at least one return duct for cooling particles prior to passage of the particles to said gas inlet tube from said at least one return duct; and
- means for introducing particles from said inner part of said bubbling fluidized bed into the hot gas introduced into said gas inlet tube to effect cooling of the hot gas introduced by said inlet tube.

25. Apparatus as recited in claim 24 further comprising fluidizing nozzles for fluidizing the particles in said fluidized bed; and wherein said gas inlet tube has an open top thereof at substantially the same vertical level as said fluidizing nozzles.

* * * * *